United States Patent Office 3,178,407
Patented Apr. 13, 1965

3,178,407
1-(PIPERIDYL)-HIGHER ALKAN-1-OLS
Karl Hoffmann, Binningen, and Ernst Sury, Basel, Switzerland, assignors to Ciba Corporation, a corporation of Delaware
No Drawing. Filed Nov. 9, 1961, Ser. No. 151,158
Claims priority, application Switzerland, Nov. 15, 1960, 12,799/60; Sept. 26, 1961, 11,182/61
15 Claims. (Cl. 260—293.4)

The present invention relates to piperidylalkanols of the formula

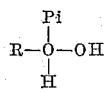

where Pi represents a piperidyl radical and R an alkyl radical containing at least 8, preferably 8 to 18, carbon atoms their salts and quaternary ammonium compounds.

The piperidyl radical, which is bound to the remainder of the molecule in position 2, 3 or 4, may be substituted above all at the nitrogen atom. Suitable N-substituents are for example the following: lower alkyl, such as methyl, ethyl or propyl or lower hydroxyalkyl, preferably hydroxyethyl or hydroxypropyl. Also in other positions of the piperidyl radical there may be substituents, such, for example, as the lower alkyl mentioned above.

The term "quaternary ammonium compounds" refers above all to lower alkyl, aralkyl or aryloxyalkyl-ammonium compounds.

The new compounds possess valuable properties; inter alia, they have an antibacterial action, especially against gram-positive bacteria, such as tubercle bacilli, and a fungicidal action, for example, against *Candida albicans*, *Trichophyton interdigitalis* as well as against viruses. Consequently they can be used as medicaments, primarily for the treatment of bacterial, fungal, and virus infections, such as are caused, for example, by the aforementioned pathogens, or as disinfecting or preserving agents. They can also be used as starting or intermediate products for the manufacture of other valuable compounds.

Of special value in this connection are the compounds of the formula

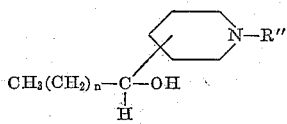

where n represents a whole number from 7 to 17, especially from 8 to 12, and R″ stands for a lower alkyl or hydroxyalkyl group or, particularly, for hydrogen, their salts and quaternary lower alkyl-ammonium compounds which are resistant to soap and sera. Special mention deserves 1-(3′-piperidyl)-tridecane-1-ol and salts thereof.

The new compounds are obtained by methods as such known; thus, a pyridyl-alkanol of the formula

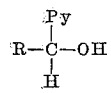

where Py represents a pyridyl radical which may be C- and/or N-substituted, R represents an alkyl radical having at least 8 carbon atoms can be treated with a hydrogenating agent.

The hydrogenation can be carried out with agents that are known for the hydrogenation of a pyridine ring or a pyridinium ring. Thus, for example, the hydrogenation is carried out with hydrogen in the presence of a metal catalyst, e.g. Raney or Rupe nickel, or preferably a noble metal catalyst, such as platinum oxide or palladium carbon. The hydrogenation is advantageously performed in a diluent, e.g. an acid such as glacial acetic acid, or an alcohol such as isopropanol, at room temperature or at a raised temperature, under atmospheric or superatmospheric pressure.

The piperidyl radical in any N-unsubstituted piperidyl-alkanol obtained can be N-substituted in a manner known per se. Lower alkyl groups, for example, can be introduced by reaction with reactive esters of lower alkanols, e.g. halides, sulfates or sulfonates of lower alkyl, or with lower alkanals, accompanied or followed by the reduction of the resulting adduct. Lower hydroxyalkyl groups can be introduced advantageously by the action of lower alkylene oxides, especially of 1,2-alkylene oxides. Resulting N-substituted piperidyl alkanols can be quaternated according to known methods. To this end there are used preferably reactive esters of lower alkanols, aralkanols or aryloxyalkanols, such as their esters with strong inorganic or organic acids, e.g. hydrohalic acids, sulfuric acid or arylsulfonic acids.

Depending on the reaction conditions used the new compounds are obtained in the form of the free bases or their salts. From the bases therapeutically useful salts can be formed, for example, those of inorganic acids, such as hydrohalic, sulfuric, phosphoric, nitric or perchloric acid; or of organic acids, especially carboxylic or sulfonic acids, such as formic, acetic propionic, oxalic, succinic, glycollic, lactic, malic, tartaric, citric, ascorbic, hydroxymaleic, dihydroxymaleic or pyruvic acid; phenylacetic, phenoxyacetic, 2,4-dichloro-phenoxyacetic acid, benzoic, para-aminobenzoic, anthranilic, para-hydroxy-benzoic acid, salicylic, acetylsalicylic, para-amino- or 5-chlorosalicylic acid; methanesulfonic, ethanesulfonic, hydroxyethanesulfonic, ethylenesulfonic, toluenesulfonic, naphthalenesulfonic or sulfanilic acid, methionine, tryptophane, lysine or arginine.

The new compounds may contain asymmetrical carbon atoms so that they are obtained in the form of racemate mixtures which can be separated by conventional mehods, such as fractional crystallization. The individual racemates can be resolved in the usual manner into the optically active antipodes.

The invention further includes any variant of the present process in which an intermediate obtained at any stage of the process is used as starting material, and the remaining step or steps is/are carried out, or the process is discontinued at any stage thereof, or the starting materials are formed under the reaction conditions or used in the form of their salts or quaternary ammonium compounds.

The starting materials are known or can be prepared by known methods, for example by reacting a pyridine aldehyde with a suitable Grignard compound. The pyridyl-alkanols so obtained can then be converted in per se conventional manner into the N-substituted compounds. By reaction with lower alkylhalides or sulfates there are obtained, for example, the N-lower alkylpyridinium alkanols. The new starting materials and intermediates also form part of the present invention.

The new compounds can be used as medicaments in human or veterinary medicine in the form of pharmaceutical preparations containing them in admixture with a suitable vehicle or diluent. Suitable vehicles are, for example, substances that do not react with the new compounds such, for example, as water, gelatine, lactose, starch, magnesium stearate, talc, vegetable oils, benzyl alcohols, gums, polyalkylene glycols, white petroleum jelly, cholesterol or other known medicinal vehicles. The pharmaceutical preparations may be, for example, tablets, dragees, powders, ointments, creams or suppositories, or in liquid form solution, suspensions or emulsions. They may be sterilized and/or may contain assistants, such as preserving, stabilizing, wetting or emulsifying agents.

They may also contain further therapeutically useful substances.

The new compounds are also suitable as disinfectants or preservatives, for example for disinfecting the skin, such as the hands, surgical instruments, underwear or bedding or the like, and also for disinfecting or preserving victuals or animal fodder. They can be used by themselves or in admixture in solution or as an emulsion and/or together with other active or inert substances such as ointments or in the form of dry powders.

The following examples illustrate the invention.

Example 1

A solution of 20 grams of 1-(2'-pyridyl)-tridecan-1-ol in 100 cc. of glacial acetic acid is hydrogenated with the aid of 1 gram of platinum oxide as catalyst with hydrogen at 20° C. under a pressure of 1.3 atmospheres (gauge) until the pressure remains constant. The catalyst is then filtered off, the solvent evaporated, the residue treated with dilute sodium hydroxide solution, the liberated base is extracted with chloroform, the chloroform extract is washed neutral and dried. The solvent is evaporated and the residue recrystallized from petroleum ether, to yield 1-(2'-piperidyl)-tridecan-1-ol of the formula

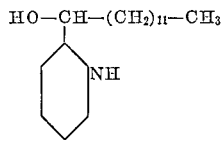

in the form of soapy crystals melting at 60–61° C.

The abovementioned starting material can be prepared, for example, by treating an ethereal solution of the Grignard compound prepared from 5 grams of magnesium and 52 grams of dodecyl bromide in an atmosphere of nitrogen dropwise at 0–5° C. with a solution of 21.4 grams of pyridine-2-aldehyde in 100 cc. of absolute ether, whereupon the whole is stirred for 2 hours at room temperature and then for one hour under reflux. After having decomposed the Grignard complex in ammonium chloride solution and carried out the usual working up, distillation in a high vacuum yields the 1-(2'-pyridyl)-tridecan-1-ol boiling at 141–145° under 0.06 mm. Hg.

Example 2

A solution of 20 grams of 1-(3'-pyridyl)-tridecan-1-ol in 100 cc. of glacial acetic acid is hydrogenated with the aid of 1 gram of platinum oxide as catalyst with hydrogen at 20° C. under a pressure of 1.3 atmospheres (gauge) until the pressure remains constant. The catalyst is filtered off, the solvent evaporated, the residue mixed with dilute sodium hydroxide solution, the liberated base extracted with chloroform, the chloroform extract is washed until neutral and then dried, the solvent is evaporated and the residue distilled in a high vacuum, to yield 1-(3'-piperidyl)-tridecan-1-ol of the formula

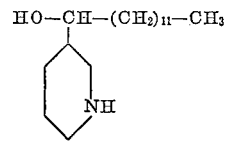

which boils at 140° C. under a pressure of 0.16 mm. Hg.

The abovementioned starting material can be prepared, for example, by treating an ethereal solution of the Grignard compound prepared from 5 grams of magnesium and 52 grams of dodecyl bromide under nitrogen dropwise at 0 to 5° C. with a solution of 21.4 grams of pyridine-3-aldehyde in 100 cc. of absolute ether and stirring the whole for 2 hours at room temperature and then for one hour under reflux. After having decomposed the Grignard complex in ammonium chloride solution and worked up the mixture in the usual manner, distillation in a high vacuum yields 1-(3'-pyridyl)-tridecan-1-ol which boils at 180 to 188° C. under a pressure of 0.09 mm. Hg.

8.8 grams of ethylene oxide are added to a solution of 28.4 grams of 1-(3'-piperidyl)-tridecan-1-ol in 100 cc. of alcohol of 95% strength or in methanol. The additive combination is catalyzed by adding 1 cc. of N-acetic acid or hydrochloric acid. The reaction mixture is kept overnight and then evaporated to dryness and the residue is distilled in a high vacuum, to yield the 1-(1'-β-hydroxyethyl-3'-piperidyl)-tridecan-1-ol of the formula

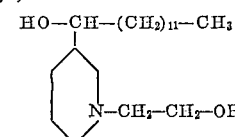

which boils at 186–200° C. under a pressure of 0.09 mm. Hg.

A solution of 14.2 grams of 1-(3'-piperidyl)-tridecan-1-ol in 50 cc. of methanol is treated with 11.1 grams of 2:4-dichlorophenoxyacetic acid and the solution is evaporated to dryness in vacuo. The resulting 2:4-dichlorophenoxy-acetate of 1-(3'-piperidyl)-tridecan-1-ol of the formula

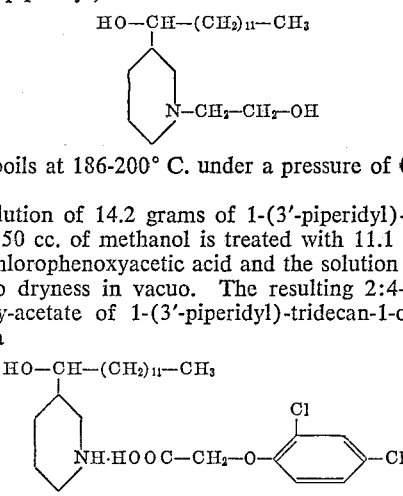

forms a viscous oil which crystallizes only with difficulty.

A solution of 14.2 grams of 1-(3'-piperidyl)-tridecan-1-ol in 50 cc. of methanol is treated with 9 grams of acetyl-salicyclic acid and the solution is evaporated to dryness in vacuo. The resulting 1-(3'-piperidyl)-tridecan-1-ol acetylsalicylate of the formula

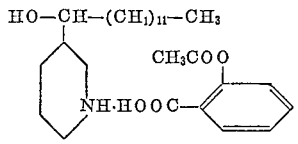

forms a viscous oil.

Example 3

A solution of 20 grams of 1-(4'-pyridyl)-tridecan-1-ol in 100 cc. of glacial acetic acid is hydrogenated with the aid of 1 gram of platinum oxide as catalyst with hydrogen at 20° C. and under a pressure of 1.3 atmospheres (gauge) until the pressure remains constant. The catalyst is filtered off, the solvent evaporated, the residue treated with dilute sodium hydroxide solution, the liberated base is extracted with chloroform, the chloroform extract washed until neutral and then dried, the solvent is evaporated and the residue is recrystallized from petroleum ether, to yield 1-(4'-piperidyl)-tridecan-1-ol of the formula

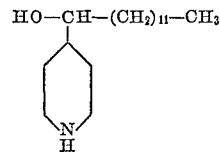

in the form of soapy crystals melting at 95 to 96° C.

The abovementioned starting material can be prepared, for example, by treating an ethereal solution of the Grignard compound prepared from 5 grams of magnesium and 52 grams of dodecyl bromide under nitrogen at 0 to 5° C. dropwise with a solution of 21.4 grams of pyridine-4-aldehyde in 100 cc. of absolute ether, then stirred the mixture for 2 hours at room temperature and for one hour under reflux. Decomposition of the Grignard complex in ammonium chloride solution, followed by conventional working up and distillation in a high vacuum, yields 1-(4'-pyridyl)-tridecan-1-ol boiling at 160 to 180° C. under a pressure of 0.09 mm. Hg.

Example 4

A solution of 277 grams of 1-(3'-pyridyl)-tridecan-1-ol in 710 cc. of isopropanol is hydrogenated with the aid of 10 grams of palladium carbon containing 10% of palladium as catalyst in an autoclave with hydrogen at 115° C. under an initial pressure of 100 atmospheres (gauge) until the pressure remains constant. The catalyst is filtered off, the solvent evaporated and the residue (280 grams) is distilled in a high vacuum, to yield 1-(3'-piperidyl)-tridecan-1-ol boiling at 140 to 142° C. under a pressure of 0.1 mm. Hg; it is identical with the compound obtained as described in Example 2.

Example 5

The following compounds are obtained by the process described in Examples 1 to 4:

|  | Melting point, ° C. |
|---|---|
| 1-(2'-piperidyl)-undecan-1-ol | 59.5–61 |
| 1-(2'-piperidyl)-nonadecan-1-ol | 64–65 |
| 1-(3'-piperidyl)-undecan-1-ol | 53–55 |
| 1-(3'-piperidyl)-heptadecan-1-ol | 55–57 |
| 1-(3'-piperidyl)-nonadecan-1-ol | 59–60 |
| 1-(4'-piperidyl)-nonan-1-ol | 84–86 |
| 1-(4'-piperidyl)-undecan-1-ol | 96–97 |
| 1-(4'-piperidyl)-pentadecan-1-ol | 89–91 |
| 1-(4'-piperidyl)-heptadecan-1-ol | 97–98 |
| 1-(4'-piperidyl)-nonadecan-1-ol | 94–96 |
| 1-(2'-piperidyl)-heptadecan-1-ol | 65–67 |
| 1-(2'-piperidyl)-nonan-1-ol | 64–65 |
| 1-(2'-piperidyl)-pentadecan-1-ol | 60–62 |

The starting materials used for this purpose are prepared as described in Examples 1 to 3:

|  | Boiling point ° C. | Mm. Hg pressure |
|---|---|---|
| 1-(2'-pyridyl)-undecan-1-ol | 129–134 | 0.08 |
| 1-(2'-pyridyl)-nonadecan-1-ol | M.P. 60–63 |  |
| 1-(3'-pyridyl)-undecan-1-ol | 140–155 | 0.06 |
| 1-(3'-pyridyl)-heptadecan-1-ol | 180–196 | 0.09 |
| 1-(3'-pyridyl)-nonadecan-1-ol | M.P. 63–65 |  |
| 1-(4'-pyridyl)-nonan-1-ol | 143–148 | 0.06 |
| 1-(4'-pyridyl)-undecan-1-ol | 150–155 | 0.06 |
| 1-(4'-pyridyl)-pentadecan-1-ol | 182–204 | 0.09 |
| 1-(4'-pyridyl)-heptadecan-1-ol | 196–210 | 0.07 |
| 1-(4'-pyridyl)-nonadecan-1-ol | M.P. 66–67 |  |
| 1-(2'-pyridyl)-heptadecan-1-ol | 210–218 | 0.11 |
| 1-(2'-pyridyl)-nonan-1-ol | 116–118 | 0.09 |
| 1-(2'-pyridyl)-pentadecan-1-ol | 169–175 | 0.08 |

Example 6

39 grams of 1-(3'-piperidyl)-tridecan-1-ol, 19 grams of formic acid (98–100%) and 31 grams of aqueous formaldehyde solution (40%) are heated together at 100–120° C. for 4 hours. The reaction mixture is then treated with ice, and from the aqueous solution the base is liberated with concentrated sodium hydroxide solution. The base is extracted with ether, and the ethereal solution washed neutral with water, dried over potassium carbonate, and then evaporated. The residue (39 grams) is distilled in a high vacuum, the resulting 1-(1'-methyl-3'-piperidyl)-tridecan-1-ol of the formula

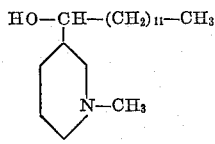

passing over at 140–148° C. under a pressure of 0.08 mm. of mercury.

Example 7

40 grams of 1-(1'-methyl-3'-piperdinium)-tridecan-1-ol-methosulfate, dissolved in 100 cc. of isopropanol, with 1 gram of platinum oxide as catalyst, are agitated in an atmosphere of hydrogen at 20° C. until the absorption of hydrogen ceases. The catalyst is filtered off and the solvent evaporated. The residue is dissolved in water, the base precipitated with sodium hydroxide solution, extracted with ether, and worked up by the process described in Example 6. There are obtained 16 grams 1-(1'-methyl-3'-piperidyl)-tridecan-1-ol.

The 1 - (1'-methyl-3'-pyridinium)-tridecan-1-ol-methosulfate used as starting material is obtained by reacting 27.7 grams of 1-(3'-pyridyl)-tridecan-1-ol with 13 grams of dimethylsulfate in 50 cc. of isopropanol.

Example 8

14 grams of 1 - (1'-methyl-3'-piperidyl)-tridecan-1-ol are reacted at 80–90° C. with 6.5 grams of dimethyl sulfate in 50 cc. of isopropanol. When the solvent is expelled, the resulting 1-(1'-dimethyl-piperidinium)-tridecan-1-ol-methosulfate of the formula

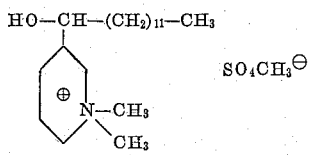

is obtained in the form of a water-soluble, viscous oil.

What is claimed is:
1. 1-(3'-piperidyl)-tridecan-1-ol.
2. 1-(2'-piperidyl)-tridecan-1-ol.
3. 1-(4'-piperidyl)-tridecan-1-ol.
4. 1-(1'-β-hydroxy-ethyl-3'-piperidyl)-tridecan-1-ol.
5. 1-(1'-methyl-3'-piperidyl)-tridecan-1-ol.
6. 1-(2'-piperidyl)-undecan-1-ol.
7. 1-(3'-piperidyl)-undecan-1-ol.
8. 1-(4'-piperidyl)-undecan-1-ol.
9. A member selected from the group consisting of a compound of the formula

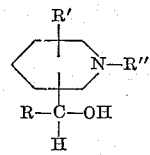

in which R is alkyl having from 8 to 18 carbon atoms, R' is a member selected from the group consisting of hydrogen and lower alkyl, and R'' is a member selected from the group consisting of hydrogen, lower alkyl, and hydroxy-lower alkyl, a therapeutically acceptable acid addition salt thereof, and a lower alkyl quaternary ammonium compound thereof.

10. A compound of the formula

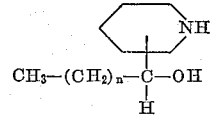

in which the letter $n$ is an integer from 8 to 12.

11. A lower alkyl quaternary ammonium compound of a compound of the formula

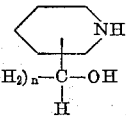

in which the letter $n$ is an integer from 7 to 17.

12. A therapeutically acceptable acid addition salt of a compound of the formula

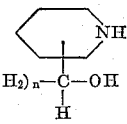

in which the letter $n$ is an integer from 7 to 17.

13. A therapeutically acceptable acid addition salt of a compound of the formula

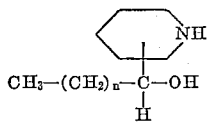

in which the letter $n$ is an integer from 8 to 12.

14. A compound of the formula

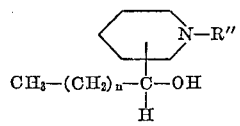

in which the letter $n$ is an integer from 8 to 12, and $R''$ is lower alkyl.

15. A therapeutically acceptable acid addition salt of a compound of the formula

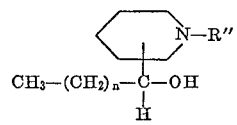

in which the letter $n$ is an integer from 8 to 12, and $R''$ is lower alkyl.

References Cited by the Examiner

UNITED STATES PATENTS

| | | | |
|---|---|---|---|
| 2,520,037 | 8/50 | Cohen | 260—297 |
| 2,540,680 | 2/51 | Lauter | 260—297 |
| 2,739,968 | 3/56 | Sperber | 260—294.7 |
| 3,014,037 | 12/61 | Rorig | 260—294.7 |
| 3,024,242 | 3/62 | Bodanszky et al | 260—294.7 |

OTHER REFERENCES

Galinovsky et al: Monatschefte für Chemie, volume 79, pages 426–429.

Clemo et al.: Journal of the Chemical Society (1949), pages 2095–2097.

McCarty et al.: Journal of the American Chemical Society, volume 79, pages 473–475 (1957).

IRVING MARCUS, *Primary Examiner.*

WALTER A. MODANCE, *Examiner.*